US010464728B2

(12) United States Patent
Cruz

(10) Patent No.: US 10,464,728 B2
(45) Date of Patent: Nov. 5, 2019

(54) PEELABLE/RESEALABLE PACKAGE WITH ABSORBENT STRIP

(71) Applicant: Bemis Company, Inc., Neenah, WI (US)

(72) Inventor: Tara K. Cruz, Appleton, WI (US)

(73) Assignee: Bemis Company, Inc., Neenah, WI (US)

( * ) Notice: Subject to any disclaimer, the term of this patent is extended or adjusted under 35 U.S.C. 154(b) by 0 days.

(21) Appl. No.: 15/561,619

(22) PCT Filed: Apr. 20, 2015

(86) PCT No.: PCT/US2015/026646
§ 371 (c)(1),
(2) Date: Sep. 26, 2017

(87) PCT Pub. No.: WO2016/171647
PCT Pub. Date: Oct. 27, 2016

(65) Prior Publication Data
US 2018/0072476 A1    Mar. 15, 2018

(51) Int. Cl.
*B65D 75/30* (2006.01)
*B32B 7/05* (2019.01)
(Continued)

(52) U.S. Cl.
CPC ............... *B65D 75/30* (2013.01); *B32B 1/02* (2013.01); *B32B 3/06* (2013.01); *B32B 5/022* (2013.01);
(Continued)

(58) Field of Classification Search
CPC .. B65D 75/30; B65D 81/264; B65D 75/5855; B65D 33/20; B65D 33/18; B65D 33/1691; B32B 27/12; B32B 7/06
(Continued)

(56) References Cited

U.S. PATENT DOCUMENTS 3,595,722 A * 7/1971 Dawbarn ............... B29C 70/086
156/177
4,215,626 A  8/1980 Giulianotto
(Continued)

FOREIGN PATENT DOCUMENTS

CA    2002096 A1    8/1990
WO    8705583 A1    9/1987

*Primary Examiner* — Steven A. Reynolds
(74) *Attorney, Agent, or Firm* — Amy L. De Coster

(57) ABSTRACT

The present invention is directed to flexible peelable/reseatable packages uniquely well suited for packaging convenience foods such as processed meats, cheeses and the like. The packages include a peelable/resealable interface formed from a pressure sensitive adhesive (PSA) which permit the packages to be re-sealed after their initial opening. There is also an absorbent non-woven strip which is inserted between the first and second wall panels near the PSA interface. During the opening of the package when the wall panels are forced apart in opposite directions, the absorbent non-woven strip cohesively ruptures and at least a portion of the strip remains bonded to each wall panel after the package has been opened. The absorbent non-woven strip absorbs water and/or fats, grease and oils from the food products before these materials can contaminate the PSA interface.

20 Claims, 10 Drawing Sheets

(51) Int. Cl.

| | | |
|---|---|---|
| *B65D 75/58* | (2006.01) | |
| *B65D 81/26* | (2006.01) | |
| *B32B 5/02* | (2006.01) | |
| *B32B 5/08* | (2006.01) | |
| *B32B 7/06* | (2019.01) | |
| *B32B 7/12* | (2006.01) | |
| *B32B 7/14* | (2006.01) | |
| *B32B 27/12* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |
| *B32B 1/02* | (2006.01) | |
| *B32B 3/06* | (2006.01) | |

(52) U.S. Cl.
CPC ............... *B32B 5/08* (2013.01); *B32B 7/05* (2019.01); *B32B 7/06* (2013.01); *B32B 7/12* (2013.01); *B32B 7/14* (2013.01); *B32B 27/12* (2013.01); *B32B 27/306* (2013.01); *B32B 27/32* (2013.01); *B32B 27/34* (2013.01); *B32B 27/36* (2013.01); *B65D 75/5855* (2013.01); *B65D 81/264* (2013.01); *B32B 2262/02* (2013.01); *B32B 2262/062* (2013.01); *B32B 2262/14* (2013.01); *B32B 2270/00* (2013.01); *B32B 2307/31* (2013.01); *B32B 2307/514* (2013.01); *B32B 2307/546* (2013.01); *B32B 2307/726* (2013.01); *B32B 2307/738* (2013.01); *B32B 2307/748* (2013.01); *B32B 2439/70* (2013.01)

(58) Field of Classification Search
USPC .................. 206/204; 229/136; 383/210, 211
See application file for complete search history.

(56) References Cited

U.S. PATENT DOCUMENTS

| | | | |
|---|---|---|---|
| 4,808,421 A | 2/1989 | Mendenhall et al. | |
| 4,823,961 A | 4/1989 | Griesbach et al. | |
| 4,935,282 A | 6/1990 | Pawlowski et al. | |
| 5,063,644 A | 11/1991 | Herrington et al. | |
| 5,077,064 A | 12/1991 | Hustad et al. | |
| 5,176,930 A | 1/1993 | Kannankeril et al. | |
| 5,301,394 A | 4/1994 | Richardson et al. | |
| 5,442,837 A | 8/1995 | Morgan | |
| 5,445,838 A | 8/1995 | Lipinski et al. | |
| 5,545,420 A | 8/1996 | Lipinski et al. | |
| 5,603,996 A | 2/1997 | Overcash et al. | |
| 5,882,789 A | 3/1999 | Jones et al. | |
| 5,931,581 A * | 8/1999 | Garberg | B65D 33/20 383/62 |
| 5,964,532 A | 10/1999 | St. Phillips et al. | |
| 6,409,384 B1 | 6/2002 | Provan et al. | |
| 6,439,770 B2 | 8/2002 | Catchman | |
| 6,502,986 B1 * | 1/2003 | Bensur | B65D 33/20 383/204 |
| 6,524,002 B2 | 2/2003 | Tomic | |
| 6,527,444 B1 | 3/2003 | Buchman | |
| 6,609,827 B2 | 8/2003 | Bois et al. | |
| 6,616,333 B2 | 9/2003 | Kinigakis et al. | |
| 6,632,021 B2 | 10/2003 | Bois et al. | |
| 6,663,283 B1 | 12/2003 | Cappel | |
| 6,666,580 B2 | 12/2003 | Bois | |
| 6,679,027 B2 | 1/2004 | Schreiter | |
| 6,977,111 B2 | 12/2005 | Yamaguchi et al. | |
| 7,927,679 B2 | 4/2011 | Cruz et al. | |
| 8,389,596 B2 | 3/2013 | Boyce et al. | |
| 8,398,306 B2 | 3/2013 | Kinigakis et al. | |
| 8,440,293 B2 * | 5/2013 | Yasuike | B32B 7/12 264/171.1 |
| 8,646,975 B2 * | 2/2014 | Moehlenbrock | B65B 9/067 383/204 |
| 8,858,077 B2 * | 10/2014 | Shepard | B65D 31/10 383/203 |
| 8,893,457 B2 * | 11/2014 | Moehlenbrock | B65D 75/5827 383/210 |
| 9,643,756 B2 * | 5/2017 | Tanaike | B65D 33/1691 |
| 2007/0082161 A1 * | 4/2007 | Cruz | B32B 7/10 428/40.1 |
| 2007/0104395 A1 * | 5/2007 | Kinigakis | B65D 33/20 383/61.1 |
| 2007/0104398 A1 * | 5/2007 | Ours | B65B 9/20 383/211 |
| 2009/0279813 A1 | 11/2009 | Pokusa et al. | |
| 2012/0207410 A1 * | 8/2012 | Moehlenbrock | B65D 75/5827 383/95 |
| 2013/0213827 A1 * | 8/2013 | Hammad | B65D 81/2023 206/204 |
| 2013/0302475 A1 | 11/2013 | Chichowksi et al. | |
| 2014/0255561 A1 | 9/2014 | Peterka et al. | |

\* cited by examiner

PEELABLE/RESEALABLE PACKAGE WITH ABSORBENT STRIP

BACKGROUND OF THE INVENTION

The present invention relates generally to primary packaging and more particularly, to flexible peelable/resealable packages uniquely well suited for packaging convenience foods such as processed meats, cheeses and the like.

Packages which combine an easy-open feature with reclosability provide consumers with a convenient means to open a package without the use of scissors, knives or other cutting implements, and a reliable manner to re-close the package as often as needed. Various methods have been used to provide both these features which include, for example, mechanical strips, such as interlocking fasteners or zippers, and adhesives positioned on an exterior film surface or within the film structure. These methods are known in the art and have been disclosed in U.S. Pat. Nos. 5,063,644; 5,301,394; 5,442,837; 5,445,838; 5,882,789; 5,964,532; 6,409,384; 6,439,770; 6,524,002; 6,527,444; 6,609,827; 6,616,333; 6,632,021; 6,663,283; 6,666,580; 6,679,027; and 7,927,679.

One widely used means of providing package reclosability is to employ zippers compatible with flexible packages of plastic film construction. Product packaging having zipper reclose mechanisms are often employed for packaging products in situations where the consumer may wish to remove only a portion of the product and to reclose the package. One problem with such zippers is that application of zippers to a film roll makes the film roll bulky and more difficult to handle. Although packaging zippers can be applied in high speed in-line form-fill-seal operations, the equipment requirements for application of zippers and the expense of the zipper materials can be significant. While mechanical closures can be applied in form-fill-seal operations, it often requires complex manufacturing steps to apply, interconnect, and align the mechanical fastening features of each structure. Therefore, mechanical reclosable fasteners often add undue complexity, cost, and expense into the flexible packaging manufacture. In addition, zippers may not provide hermetic seals when desired. Also, some consumers have difficulty operating and manipulating zipper closures.

One method of providing easy-open and reclosability to a package which can be hermetically sealed is the use of films or film laminates having a layer of pressure sensitive adhesive (PSA). The consumer may readily open the package by cohesively rupturing the PSA layer and reseal the package along the exposed PSA interface. When the package is opened in this manner, PSA is exposed on the interior surface of each wall of the package. However, care must be taken to prevent contamination of the PSA by the contents of the package. Any matter or debris failing onto the exposed PSA surface can reduce the re tack adhesion at of the PSA interface.

A particular challenging problem encountered with packages having an exposed PSA interface is contamination of the adhesive by water and/or fats, grease and oils from processed meat and cheese products. During the manufacture of such products, significant amounts of water and/or fat may be added to the food product mixture. With some processed meat products such as sliced luncheon meats, as much as 35% to 75% by weight of the total product is water and at least 5% by weight animal or vegetable fat. When the consumer opens the package and removes an individual slice of meat or cheese, the product typically contacts the exposed PSA interface as it is drawn out of the package. Water and/or grease can be absorbed by the adhesive and/or react with the adhesive components. These interactions can often change the adhesive properties of the adhesive which then affect the resealability performance of the package. Eventually, with repeated water/grease interactions, the reseal integrity of the package may be lost. Those skilled in the art have recognized this as a potential weakness of peelable/resealable PSA interfaces in re-closable packages for processed meat and cheese products.

Accordingly, a solution to this long-felt but hitherto unresolved problem is desired which is simple and economical yet reliable, and durable.

SUMMARY OF THE INVENTION

The present invention is directed to peelable/resealable packages having particular application for packaging of processed foods, such as, but not limited to luncheon meats and cheeses. The packaging of the present invention includes a top end and a bottom end generally opposite the top end, a first side edge and a second side edge generally opposite the first side edge. These packages further include a first wall panel having an interior surface and an exterior surface, a second wall panel having an interior surface and an exterior surface, a first side heat seal located adjacent to the first side edge which extends from the top end to the bottom end, and a second side heat seal located adjacent to the second side edge which extends from the top end to the bottom end.

One important aspect of the packages of the present invention is that they include an absorbent non-woven strip located generally near the top end which is inserted between the first and second wall panels. The absorbent non-woven strip may be adhesively adhered or heat sealed to each wall panel or adhesively attached to one wall panel and heat sealed to the other wall panel. The absorbent non-woven strip may include, but is not limited to any paper-based material, cellulose material or non-woven cellulose-base and synthetic fibers or combinations thereof which are capable of absorbing water and/or grease, oil or fat. The absorbent non-woven strip is bonded to each wall panel such that the adhesion between the strip and each wall panel is greater than the cohesive strength of the non-woven strip material. During the opening of the package when the wall panels are forced apart in opposite directions, the absorbent non-woven strip cohesively ruptures and at least a portion of the strip remains bonded to each wall panel after the package has been opened. In one preferred embodiment, the absorbent non-woven strip includes a mono-layer of absorbent material which can be heat sealed between two film layers or two wall panels of the package. In another preferred embodiment, the absorbent non-woven strip includes at least two layers: a first layer comprising, an absorbent material and a second layer comprising a heat sealable material. In another preferred embodiment, the absorbent non-woven strip includes three layers: an exterior first layer comprising pressure sensitive adhesive (PSA), an interior second layer comprising an absorbent material, and an exterior third layer comprising pressure sensitive adhesive (PSA). Alternatively, the absorbent non-woven strip may include an exterior first layer comprising a heat sealable material, an interior second layer comprising an absorbent material, and an exterior third layer comprising a heat sealable material. In still another preferred embodiment, the absorbent non-woven strip includes at least four layers: an exterior first layer comprising heat sealable material, an interior second layer comprising an absorbent material, an interior third layer comprising an oriented thermoplastic material, and an exterior fourth layer of pressure sensitive adhesive (PSA). In yet another preferred embodiment, the absorbent non-woven strip comprises an exterior first layer of non-woven absorbent material, an interior second layer comprising a polyolefin, an interior third layer comprising an oriented thermoplastic material, and an exterior fourth layer of pressure sensitive adhesive (PSA).

Another important aspect of the packages of the present invention is that they have an initial closed position comprising a first peelable/resealable transverse heat seal located generally near the top end and extending between the first side edge and the second side edge which joins the interior surface of the first wall panel to the interior surface of the second wall panel. The first peelable/resealable transverse heat seal will include a cross-sectional portion of the first wall portion having an integrally formed pressure sensitive adhesive (PSA) film layer or a cross-sectional portion of the package having an inserted pressure sensitive adhesive (PSA) strip. In one preferred embodiment, the first peelable/resealable transverse heat seal is placed superimposed laterally over the integrally formed pressure sensitive adhesive (PSA) film layer or inserted pressure sensitive adhesive (PSA) strip. The first peelable/resealable transverse heat seal is positioned such that the cross-sectional area of the wall panel under the heat seal includes at least part of the non-woven absorbent strip and either the integrally formed pressure sensitive adhesive (PSA) film layer or the inserted pressure sensitive adhesive (PSA) strip. Alternatively, in another preferred embodiment, the first peelable/resealable transverse heat seal is placed offset laterally between the non-woven absorbent strip and the top end. In this offset position, the first peelable/resealable transverse heat seal will include either a cross-sectional portion of the first wall portion having an integrally formed pressure sensitive adhesive (PSA) film layer or a cross-sectional portion of the package having an inserted pressure sensitive adhesive (PSA) strip.

In another preferred embodiment, the packages of the present invention may further include a second peelable/resealable transverse heat seal placed below the non-woven absorbent strip and the first peelable/resealable transverse heat seal. The second peelable/resealable transverse heat seal extends between the first side edge and the second side edge and joins the interior surface of the first wall panel to the interior surface of the second wall panel.

Another important aspect of the packages of the present invention is that they include an open position where the first wall panel and the second wall panel are separated at the first peelable/resealable transverse heat seal. This open position comprises an exposed first section of the interior surface of the first wall panel comprising pressure sensitive adhesive (PSA), an exposed second section of the interior surface of the first wall panel comprising the non-woven absorbent material, an exposed first section of the interior surface of the second wall panel comprising pressure sensitive adhesive (PSA), and an exposed second section of the interior surface of the second wall panel comprising the non-woven absorbent material. In one preferred embodiment, the exposed sections of pressure sensitive adhesive (PSA) and non-woven absorbent material on each wall panel are adjacent to each other. In another preferred embodiment, the exposed sections of pressure sensitive adhesive (PSA) and non-woven absorbent material on each wall panel are offset away from each other.

As used herein, the terms "heat seal" and the like refer to a first portion of a film surface (i.e., formed from a single layer or multiple layers) which is capable of forming a hermetic fusion bond to a second portion of a film surface typically under heat and pressure. A heat-seal layer is capable of fusion bonding by conventional indirect heating means which generate sufficient heat on at least one film contact surface for conduction to the contiguous film contact surface and formation of a bond interface therebetween without loss of the film integrity. It should be recognized that heat sealing can be performed by any one or more of a wide variety of manners, such as using a heat seal technique (e.g., melt-bead sealing, thermal sealing, impulse sealing, ultrasonic sealing, hot air, hot wire, infrared radiation, etc.).

Packages of the present invention incorporate a seal area having a peelable/resealable film interface which provide an easy means to both open the package without having to tear the packaging material and re-close the package as often as needed. In general, these peelable/resealable film interfaces are formed when two film surfaces are bonded or sealed together during the package fabrication process. This seal area or bond is considered "peelable" if the consumer simply grasps a portion of the wall panel and pulls or "peels" it away from a second wall panel. The initial force needed to separate the wall panels is relatively strong before the package is opened in order for the seal area to withstand the expected abuse during the packaging operation, distribution, and storage. By contrast, after the package has been initially opened, the peeling force required to break the seal and re-open the package is relatively weak thereafter. Moreover, the package is considered "resealable" if the consumer simply engages the two wall panel surfaces together. Generally, the force required to affect either an adhesive or a cohesive failure between wall panel surfaces may be measured by its "peel strength" in accordance with ASTM F-904 test methods. A peelable package structure is adapted to remain secure and unbroken during package fabrication, distribution and storage, and yet may be relatively easily ruptured. Accordingly, a peelable package structure may include a frangible layer such as a pressure sensitive adhesive having a peel strength of between 500 gram-force/inch (87.6 Newton/meter) and 5000 gram-force/inch (875.5 Newton/meter) as measured in accordance with ASTM F-904 test method. As used herein, the term "resealable" refers to an interface adapted to re-adhere to itself after separation. The force required to "reseal" these pressure sensitive adhesive interfaces is proportional to the manual pressure exerted on the film. Consequently, a peelable and resealable pressure sensitive adhesive interface will exhibit a first interfacial peel strength and a second interfacial (or re-tack) peel strength. The peelable, resealable seals which incorporate an pressure sensitive adhesive interface have a first peel strength of between 500 gram-force/inch (87.6 Newton/meter) and 3000 gram-force/inch (525.3 Newton/meter) and a second peel strength of between 350 gram-force/inch (61.3 Newton/meter) and 1000 gram-force/inch (175.1 Newton/meter) as measured in accordance with ASTM F-904 test method. In contrast, a permanent pressure sensitive adhesive interface cannot be readily manually peeled apart and has a peel strength greater than 2500 gram-force/inch (437.8 Newton/meter).

BRIEF DESCRIPTION OF THE DRAWINGS

Further features and advantages of the present invention will become apparent from the following detailed description, taken in combination with the appended drawings, in which.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1A:
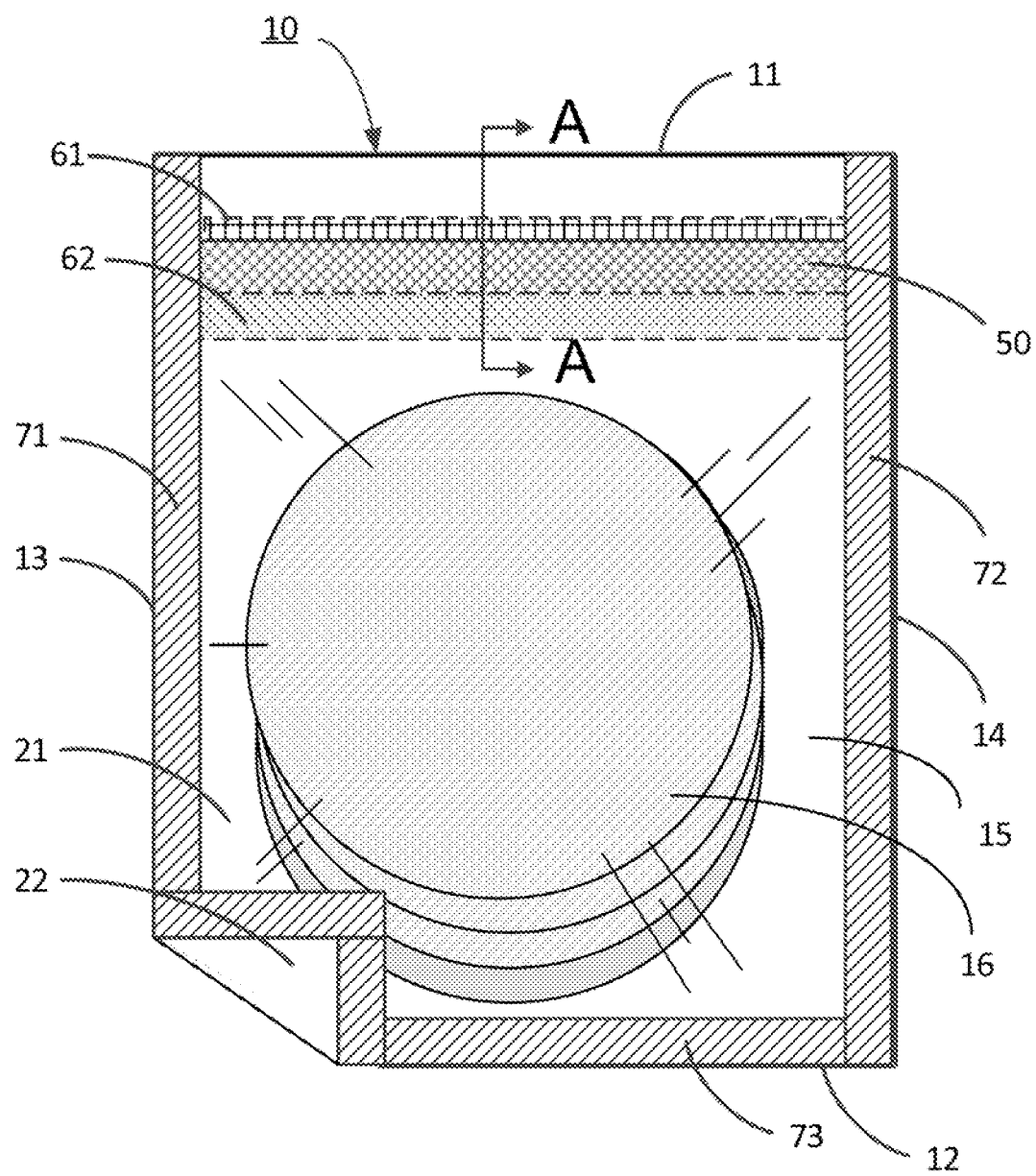
FIG. 1a is a schematic view of one embodiment of a package in an initial closed position according to the present invention.
Figure 1B:
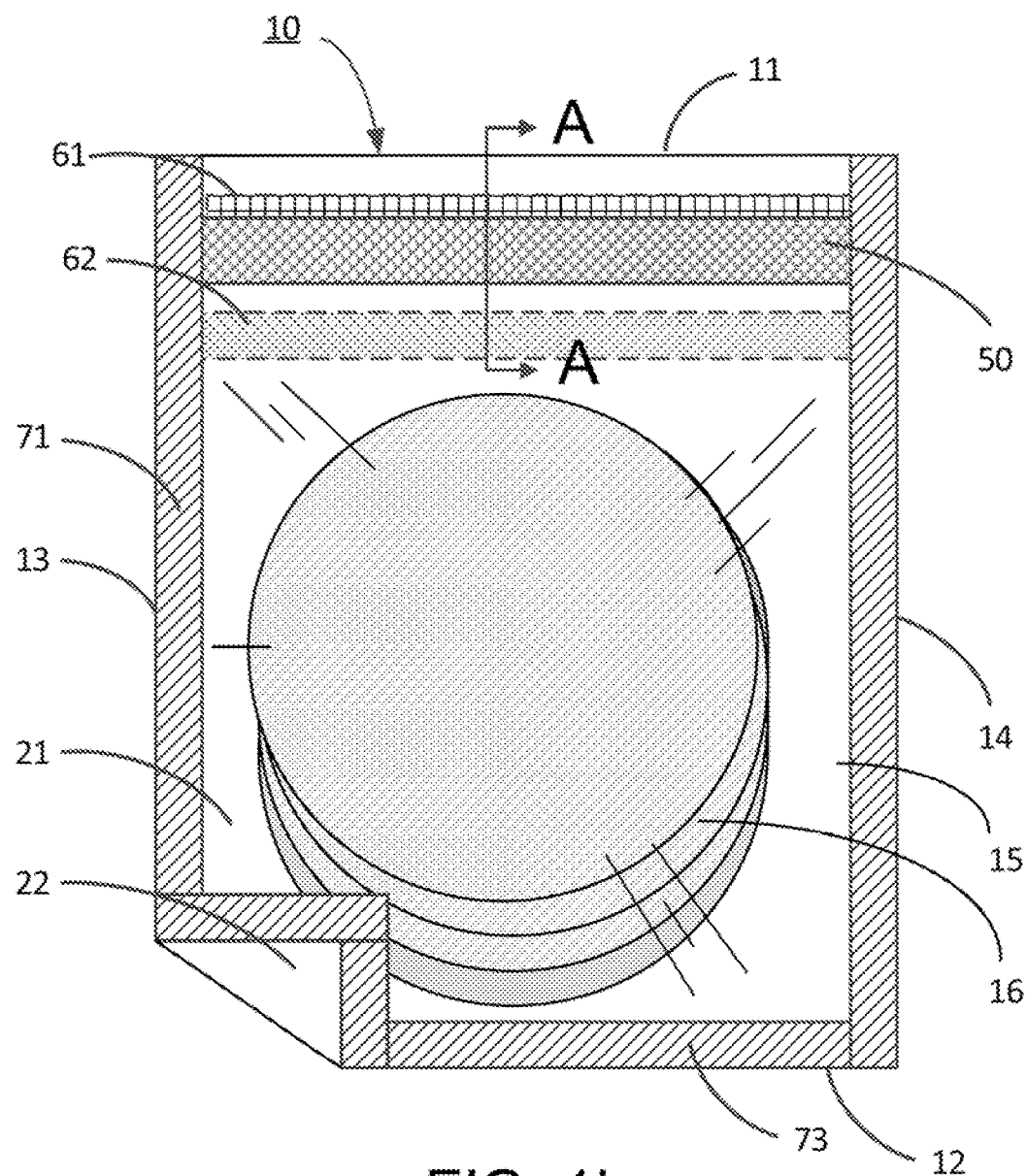
FIG. 1b is a schematic view of another embodiment of a package in an initial closed position according to the present invention.
Figure 1C:
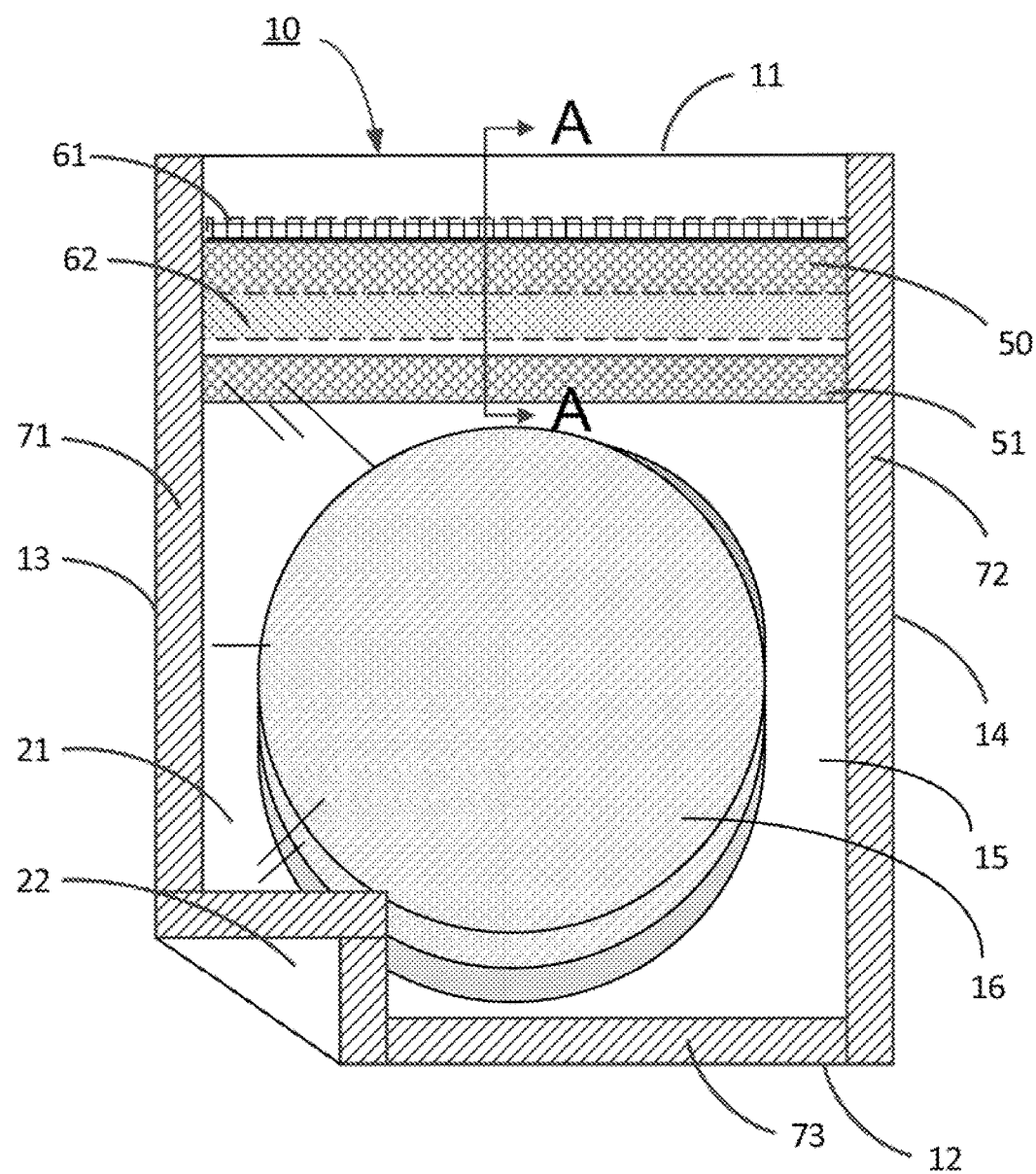
FIG. 1c is a schematic view of still another embodiment of a package in an initial closed position according to the present invention.

Shown in FIGS. 1a-1c are preferred embodiments of the flexible peelable/resealable package 10 of the present invention. Each of these embodiments includes a top end 11, an opposing bottom end 12, a first side edge 13 and a second side edge 14 generally opposite the first side edge, a first wall panel 21 and a second wall panel 22. The first and second wall panels each have an interior surface, 21a and 22a, and an exterior surface, 21b and 22b, respectively. In one preferred embodiment, the first wall panel and the second wall panel may comprises the same thermoplastic film and each may be rigid or flexible. Alternatively, in another preferred embodiment, the first wall panel may include a rigid or flexible non-thermoformed multilayer thermoplastic film and the second wall panel may include a rigid or flexible thermoformed multilayer thermoplastic film.

It is within the scope of the present invention for the peelable/resealable package to include any number of seals or heat seals as needed for a particular packaging application. In the preferred embodiments of the present invention, there are a first longitudinal side seal 71 positioned proximal to the first side edge 13 extending from the top end 11 to the bottom end 12, and a second longitudinal side seal 72 positioned proximal to the second side edge 14 extending from the top end to the bottom end. The first and second longitudinal side seals may be formed by a cold seal material or an adhesive material, fusion heat sealing, or a combination of a cold seal material or an adhesive material and fusion heat sealing. In each of these embodiments, the packages further include a transverse end seal 73 positioned proximal to bottom end 12 which extends across the package from first side edge 13 to second side edge 14.

Figure 2A:
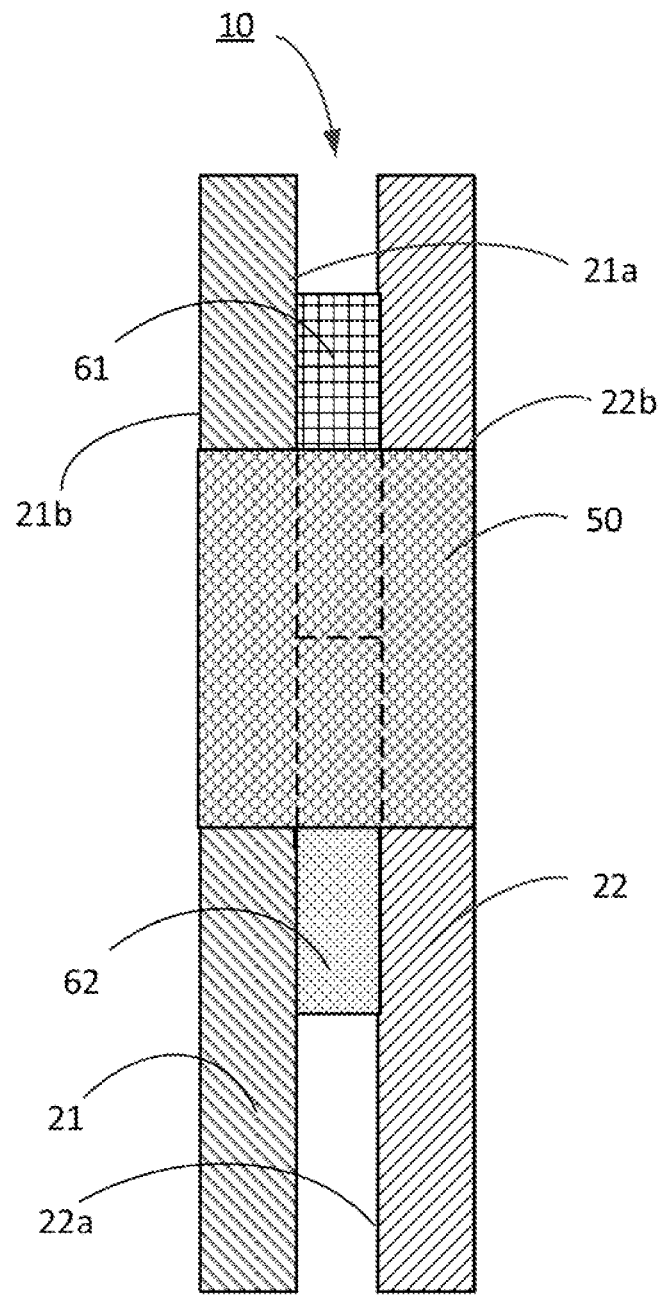
FIG. 2a is a cross-sectional view of the package illustrated in FIG. 1a taken along line A-A.

The packages of the present invention also include an absorbent non-woven strip 62 located generally near the top end 11 which is inserted between the first and second wall panels 21 and 22, and a first peelable/resealable heat seal 60 (indicated by cross-hatching) also located near top end 11 of the package which extends from the first side edge 13 to the second side edge 14. Absorbent non-woven strip 62 may be inserted between the first and second wall panels using an in-line packaging processes similar to that used for inserting conventional zipper closures during the form-fill-seal operation which is well-known in the art. In one embodiment, the absorbent non-woven strip may be a monolayer of paper or cellulose-like material joined to each wall panel by application of heat and pressure such that a portion of the heat sealable material of the interior surfaces 21a and 22a of the first and second wall panels flows into and becomes intertwined with the fibers of the absorbent non-woven strip. In other embodiments, absorbent non-woven strip 62 may include one or more heat sealable or adhesive layers to assist with adhering each side of the strip to the wall panels. For example, in one preferred embodiment, the absorbent non-woven strip is a three-layer structure which includes a first heat sealable layer of ethylene vinyl acetate copolymer (EVA) or polyethylene (PE), a central layer of absorbent non-woven cellulose, and a second heat sealable layer of ethylene vinyl acetate copolymer (EVA) or polyethylene (PE). Positioning of the absorbent non-woven strip 62 in the package is generally near the top end 11 of the package. In one preferred embodiment, the inserted absorbent non-woven strip 62 is disposed adjacent to the inserted pressure sensitive adhesive (PSA) strip 61 as shown in FIGS. 2a and 3a. In another preferred embodiment, the inserted absorbent non-woven strip 62 is disposed laterally offset away from the inserted pressure sensitive adhesive (PSA) strip 61 as illustrated in FIGS. 2b and 3b.

Figure 2B:
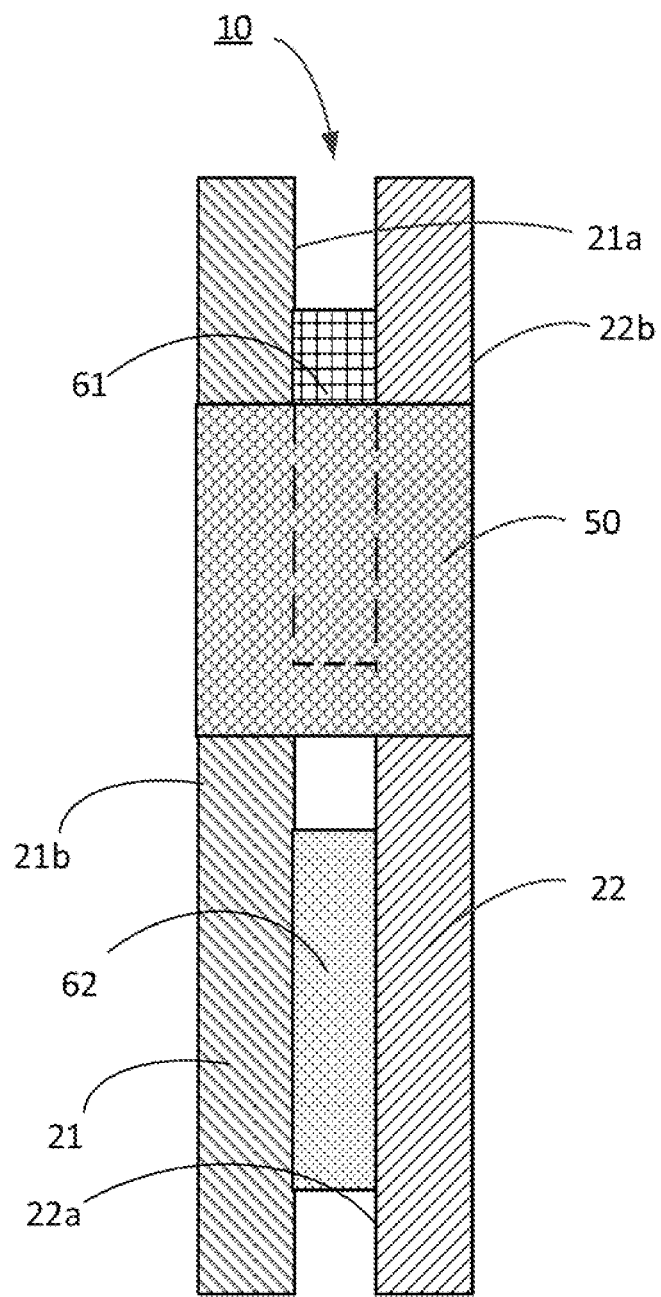
FIG. 2b is a cross-sectional view of the package illustrated in FIG. 1b taken along line A-A.
Figure 2C:
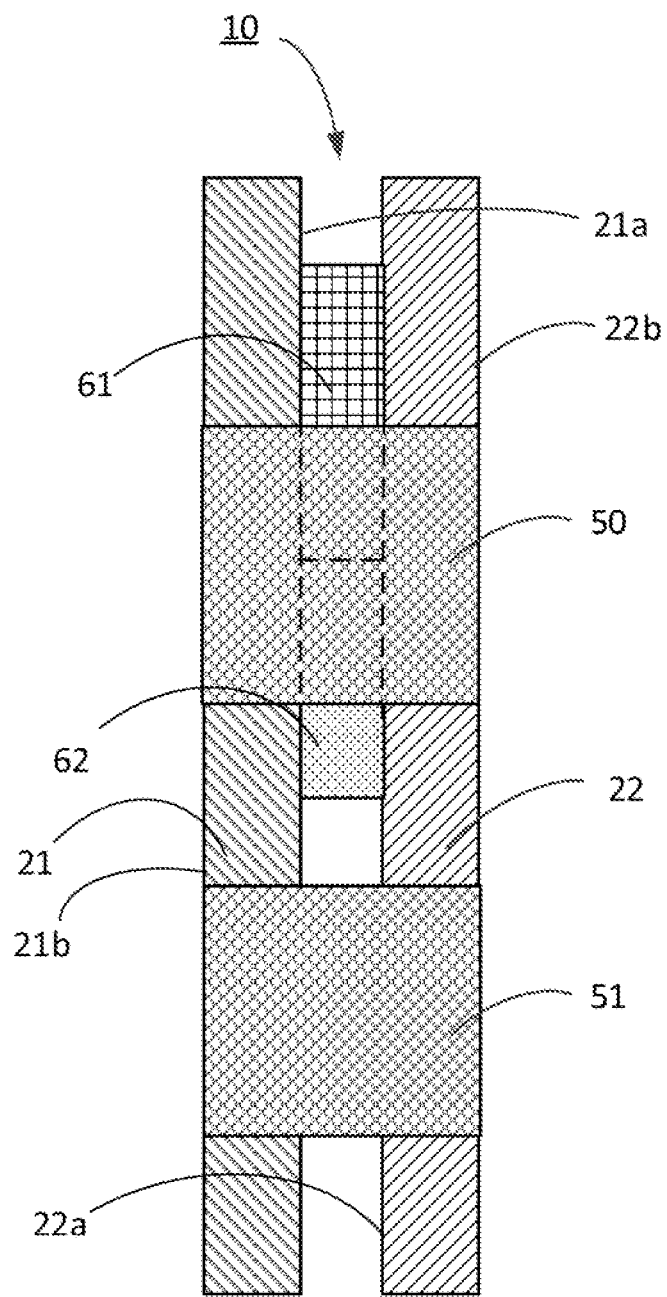
FIG. 2c is a cross-sectional of the package illustrated in FIG. 1c taken along line A-A.
Figure 3A:
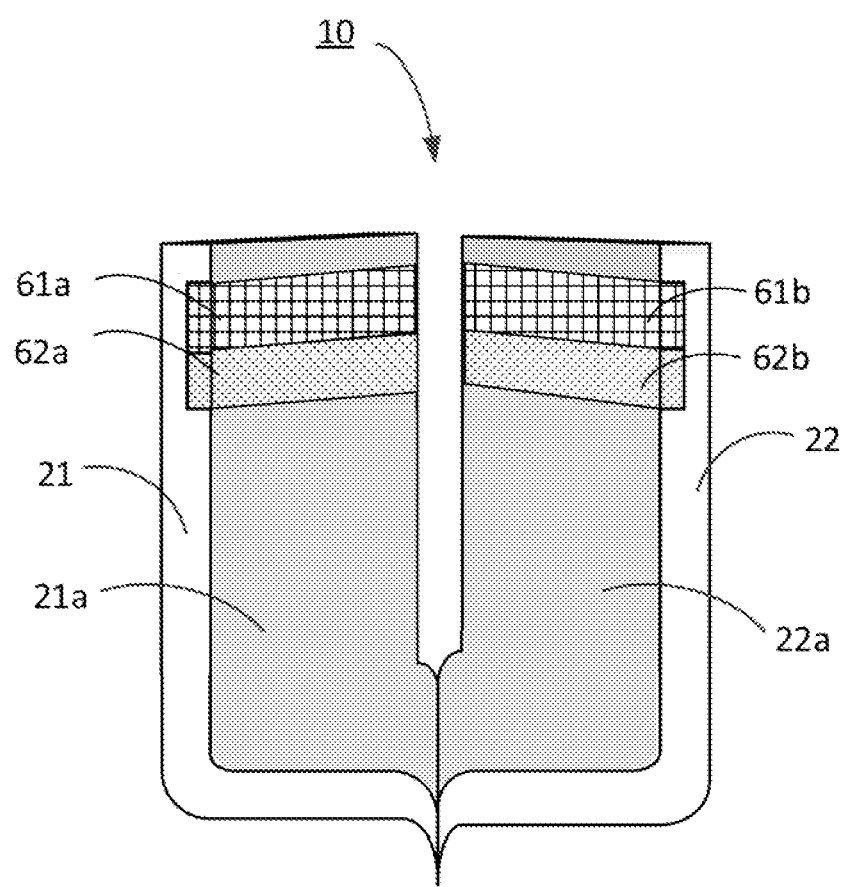
FIG. 3a is a schematic view of one embodiment of a package illustrated in FIG. 1a in an open position of the present invention.

As shown in the preferred embodiments of FIGS. 1a, 1b, 1c, 2a, 2b and 2c, the packages have an initial closed position comprising a first peelable/resealable transverse heat seal 50 located generally near the top end 11 and extending between the first side edge 13 and the second side edge 14 which joins the interior surface 21a of the first wall panel 21 to the interior surface 22a of the second wall panel 22. FIGS. 2a and 2c illustrate preferred embodiments of the present invention with the first peelable/resealable transverse heat seal 50 placed superimposed over the non-woven absorbent strip 62. While FIG. 2b depicts another preferred embodiment of the present invention with the first peelable/resealable transverse heat seal 50 positioned laterally offset between the non-woven absorbent strip 62 and the top end 11. FIG. 2b also illustrates a package according to the present invention having a second peelable/resealable transverse heat seal 51 which is positioned laterally offset away from non-woven absorbent strip 62 and first peelable/resealable transverse heat seal 50.

Figure 3B:
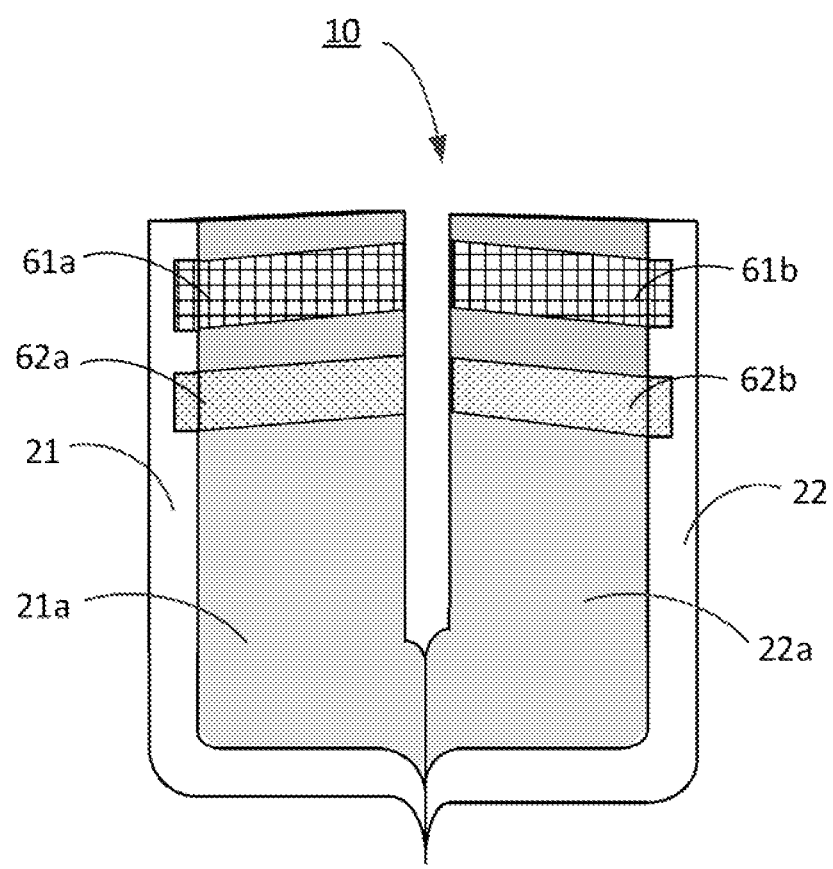
FIG. 3b is a schematic view of one embodiment of a package illustrated in FIG. 1b in an open position of the present invention.

The packages of the present invention are designed such that when a consumer wishes to access the contents of the packages of the present invention, the unsealed portions of the first and second wall panels above the first peelable/ resealable transverse heat seal 50 may be grasped and the wall panels pulled away from each other, rupturing the pressure sensitive adhesive layer which thereby creates an open position where the wall panels are separated proximal to the top end of the package as indicated in FIGS. 3a and 3b. This open position comprises sections of the interior surface 21a of the first wall panel 21 comprising exposed pressure sensitive adhesive (PSA) 61a and exposed nonwoven absorbent material 62a, and sections of the interior surface 22a of the second wall panel 22 comprising exposed pressure sensitive adhesive (PSA) 61b and exposed nonwoven absorbent material 62b. It should be noted that the exposed sections of pressure sensitive adhesive (PSA) 61a and 61b may be formed from an integrally formed pressure sensitive adhesive (PSA) film layer of a multilayer film used to create first wall panel 21 or a pressure sensitive adhesive (PSA) strip inserted between first wall panel 21 and second wall panel 22. It should also be noted here that integrally formed pressure sensitive adhesive (PSA) film layer or pressure sensitive adhesive (PSA) strip was vertically aligned underneath the peelable/resealable transverse heat seal 50. During the opening of the package when the wall panels are forced apart in opposite directions at peelable/resealable transverse heat seal 50, the pressure sensitive adhesive (PSA) layer 61 and absorbent non-woven strip 62 both cohesively rupture and at least a portion of each, i.e., pressure sensitive adhesive (PSA) sections 61a and 61b and absorbent non-woven strip 62a and 62b sections remain bonded to each wall panel after the package has been opened. These exposed sections absorbent non-woven strip 62a and 62b are thus positioned to absorb water and/or fats, grease and oils from the food products before these materials can contaminate the exposed pressure sensitive adhesive (PSA) sections 61a and 61b.

When the consumer wishes to re-close the package after its initial opening depicted in FIGS. 3a and 3b, the exposed pressure sensitive adhesive (PSA) sections 61a and 61b may be pressed together to re-seal the adhesive interface. This creates second closed position comprising an adhesive seal between the first and second wall panels at the pressure sensitive adhesive (PSA) interface. Thus, it should be evident to those skilled in the art that the packages of the present invention are peelable and resealable.

Film Examples

Figure 4:
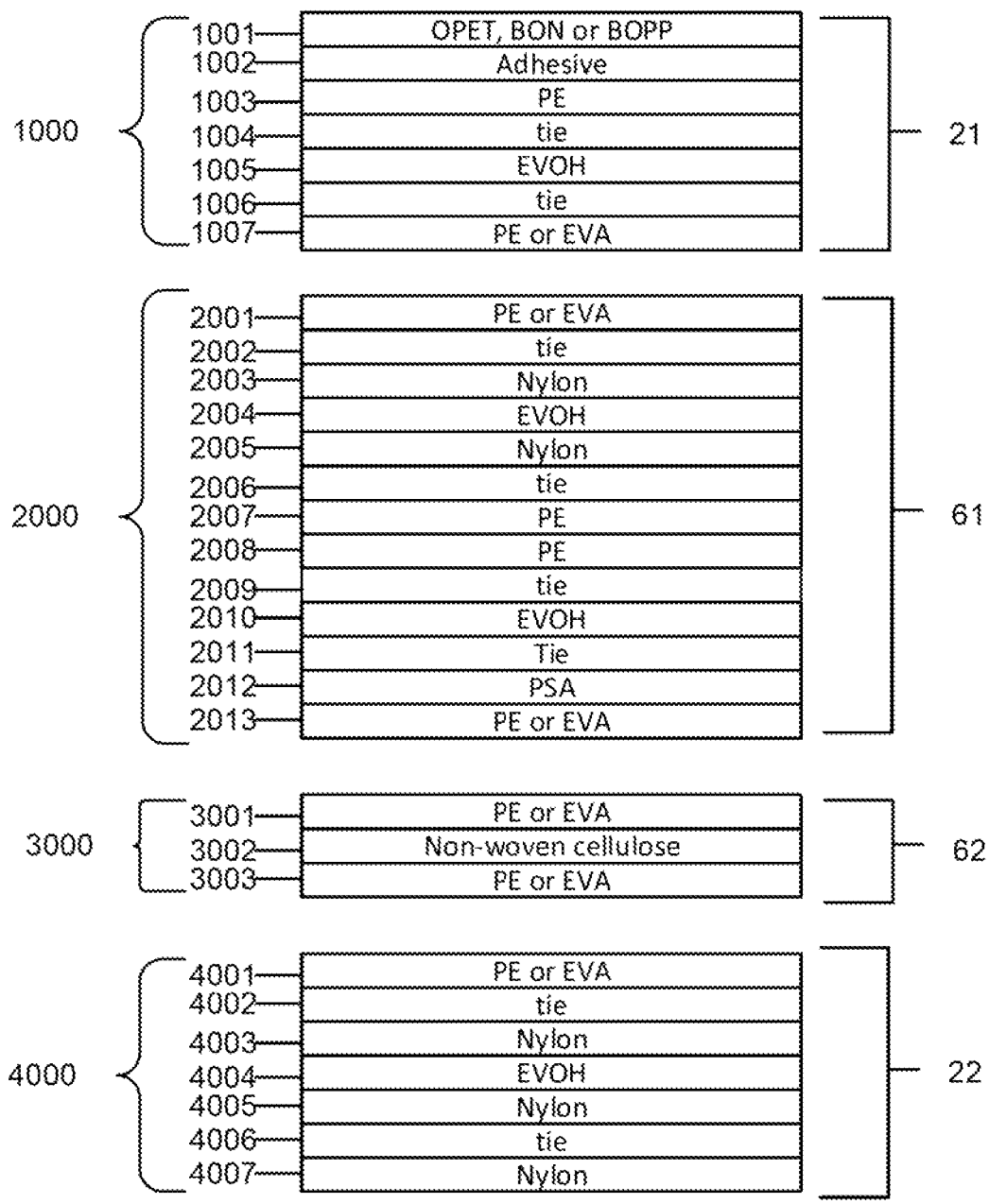
FIG. 4 is a cross-sectional view of preferred embodiments of multilayer films suitable for use as a first wall panel, an inserted peelable/resealable strip, an inserted absorbent non-woven strip, and a second wall panel in the present invention.

Referring now to FIG. 4, there is illustrated preferred embodiments of a multilayer thermoplastic film 1000 suitable for use as a first wall panel 21, a multilayer thermoplastic film 2000 suitable for use as an inserted pressure sensitive adhesive (PSA) strip 61, an inserted multilayer film 3000 suitable for use as a non-woven absorbent strip 62, and a multilayer thermoplastic film 4000 suitable for use as a second wall panel 22 in the construction of the present invention. In this embodiment, film 1000 was produced using blown film coextrusion techniques and equipment which is well-known in the art. Film 1000 may have any number film layers and film layer compositions as desired depending upon the particular packaging requirements for a given product. In this example, a first wall panel 21 was formed from film 1000 having an exterior abuse first layer 1001 which may comprise any conventional abuse material known in the art such as, but not limited to, oriented polyethylene terephthalate (OPET), nylon, biaxially oriented nylon (BON), polypropylene and biaxially oriented polypropylene (BOPP), a permanent adhesive second layer 1002 such as, but not limited to, any conventional polyurethane-based adhesive, a polyolefin third layer 1003 such as, but not limited to, polyethylene (PE), ethylene vinyl acetate copolymer (EVA) and combinations thereof, a conventional tie material fourth layer 1004 such as, but not limited to, polyolefins, anhydride-modified polyolefins and mixtures thereof, an oxygen barrier fifth layer 1005, which may comprise any conventional oxygen gas barrier material such as, but not limited to, ethylene vinyl alcohol copolymer (EVOH) and nylon, another conventional tie material sixth layer 1006, and finally another exterior seventh layer 1007 which may comprise a heat sealable polyolefin such as, but not limited to polyethylene (PE), ethylene vinyl acetate copolymer (EVA) and mixtures thereof. Seventh layer 1007 should be heat sealable to at least one of layers 2001 and 2013 of film 2000, layers 3001 and 3003 of film 3000, and layer 4001 of film 4000. The total thickness of film 1000 is generally from about 19.1 μm (0.75 mil) to about 254 μm (10 mil), most typically about 63.5 μm (2.5 mil).

Multilayer film 2000 may have any number film layers with the proviso that there is at least one layer of pressure sensitive adhesive which can cohesively delaminate from itself. In this particular example, an inserted pressure sensitive adhesive (PSA) strip 61 is formed from a multilayer film 2000 having a first layer 2001 which is an exterior layer comprising a material which is heat sealable to at least one of layer 1007 of film 1000 or layer 4001 of film 4000. As such, layer 2001 may comprise a polyolefin such as, but not limited to polyethylene (PE), ethylene vinyl acetate copolymer (EVA) and mixtures thereof. Film 2000 also includes a second layer 2002 which is a tie layer that may include any conventional tie material such as, but not limited to, polyolefins, anhydride-modified polyolefins and mixtures thereof, a third layer 2003 which may include nylon such as, but not limited to, nylon 6 and blends thereof, a fourth layer 2004 which may comprise any conventional oxygen gas barrier material such as, but not limited to, ethylene vinyl alcohol copolymer (EVOH) and nylon, a fifth layer 2005 which is another nylon layer that may include nylon 6 and blends thereof, a sixth layer 2006 which is a tie layer comprising any conventional tie material such as, but not limited to, polyolefins, anhydride-modified polyolefins and mixtures thereof, finally, a seventh layer 2007 comprising any heat sealable material such as, but not limited to polyethylene (PE), ethylene vinyl acetate copolymer (EVA) and mixtures thereof, eighth layer 2008 comprising any heat sealable material such as, but not limited to polyethylene (PE), ethylene vinyl acetate copolymer (EVA) and mixtures thereof, a ninth layer 2009 which is a tie layer comprising any conventional tie material such as, but not limited to, polyolefins, anhydride-modified polyolefins and mixtures thereof, a tenth layer 2010 may comprise any conventional oxygen gas barrier material such as, but not limited to, ethylene vinyl alcohol copolymer (EVOH) and nylon, an eleventh layer 2011 that may include any conventional tie material such as, but not limited to, polyolefins, anhydride-modified polyolefins and mixtures thereof, a twelfth layer 2012 which is a layer comprising a pressure sensitive adhesive (PSA), and finally, a thirteenth layer 2013 which is an exterior layer comprising any heat sealable material such as, but not limited to polyethylene (PE), ethylene vinyl acetate copolymer (EVA) and mixtures thereof which is heat sealable to either layer 1007 of film 1000 or layer 4001 of film 4000. The total thickness of film 1000 is generally from about 19.1 μm (0.75 mil) to about 254 μm (10 mil), most typically about 127 μm (5 mil).

In this particular embodiment, an absorbent non-woven strip 62 is formed from a multilayer film 3000 which includes a first exterior layer 3001 which may comprise any heat sealable material such as, but not limited to, polyethylene (PE), ethylene vinyl acetate copolymers (EVA) and combinations thereof, a central layer 3002 comprising any conventional non-woven cellulose material, and a second exterior layer 3003 which may comprise any heat sealable material such as, but not limited to, polyethylene (PE), ethylene vinyl acetate copolymers (EVA) and combinations thereof. Layers 3001 and 3003 are heat sealable to at least one of layer 1007 of film 1000 or layer 4001 of film 4000.

The second wall panel 22 was formed from a second multilayer film 4000. Film 4000 may have any number of layers and film layer compositions as desired depending upon the packaging requirements of a given product. In this example, film 4000 has a first layer 4001 is an exterior layer comprising any heat sealable material such as, but not limited to polyethylene (PE), ethylene vinyl acetate copolymer (EVA) and mixtures thereof which is heat sealable to at least one of layer 1007 of film 1000, layers 2001 and 2013 of film 2000, and layer 3001 and 3003 of film 3000. Film 4000 also includes a second layer 4002 comprising any conventional tie material such as, but not limited to, polyolefins, anhydride-modified polyolefins and mixtures thereof, a third layer 4003 which may include any nylon such as, but not limited to, nylon 6 and blends thereof, a fourth layer 4004 which includes any conventional oxygen gas barrier material such as, but not limited to, ethylene vinyl alcohol copolymer (EVOH) and nylon, a fifth layer 4005 which is another nylon layer comprising nylon 6 and blends thereof, a sixth layer 4006 comprising any conventional tie material such as, but not limited to, polyolefins, anhydride-modified polyolefins and mixtures thereof, and finally, a seventh layer 4007 which is an exterior abuse layer comprising any conventional abuse material known in the art such as, but not limited to, oriented polyethylene terephthalate (OPET), nylon and biaxially oriented nylon (BON) polypropylene and biaxially oriented polypropylene (BOPP).

Figure 5:
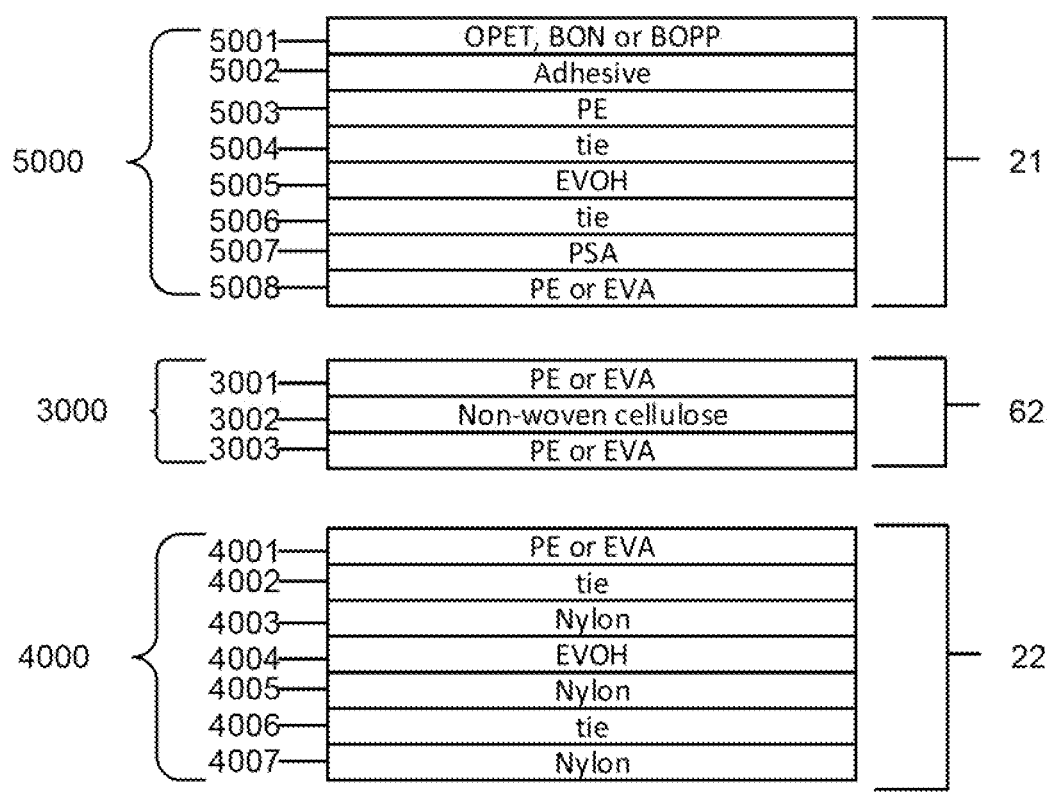
FIG. 5 is a cross-sectional view of preferred embodiments of multilayer films suitable for use as a first wall panel having an integrally formed peelable/resealable layer, an inserted absorbent non-woven strip, and a second wall panel in the present invention.

Referring now to FIG. 5, there is illustrated an alternative preferred embodiment of a multilayer thermoplastic film 5000 which is suitable as a first wall panel 21 having an integrally formed pressure sensitive adhesive (PSA) film layer. As is illustrated, multilayer films 3000 and 4000 as described above are used as the inserted non-woven absorbent strip 62 and the second wall panel 22, respectively, in combination with multilayer film 5000 to construct the packages of the present invention. Film 5000 was produced using blown film coextrusion techniques and equipment which is well-known in the art and may have any number layers and layer compositions as desired depending upon the packaging requirements of a given product. In this particular example, film 5000 includes an exterior abuse first layer 5001 which may comprise any conventional abuse material known in the art such as, but not limited to, oriented polyethylene terephthalate (OPET), nylon, biaxially oriented nylon (BON), polypropylene and biaxially oriented polypropylene (BOPP), a permanent adhesive second layer 5002 such as, but not limited to, any conventional polyurethane-based adhesive, a polyolefin third layer 5003 such as, but not limited to, polyethylene (PE), ethylene vinyl acetate copolymer (EVA) and combinations thereof, a conventional tie material fourth layer 5004 such as, but not limited to, polyolefins, anhydride-modified polyolefins and mixtures thereof, an oxygen barrier fifth layer 5005, which may comprise any conventional oxygen gas barrier material such as, but not limited to, ethylene vinyl alcohol copolymer (EVOH) and nylon, a sixth layer 5006 which is a tie layer comprising any conventional tie material such as, but not limited to, polyolefins, anhydride-modified polyolefins and mixtures thereof, finally, a seventh layer 5007 comprising any pressure sensitive adhesive (PSA), and an eighth layer 5008 which is an exterior layer comprising any heat sealable material such as, but not limited to polyethylene (PE), ethylene vinyl acetate copolymer (EVA) and mixtures thereof which is heat sealable to at least one of layers 3001 or 3003 and layer 4001 of film 4000. The total thickness of film 5000 is generally from about 19.1 µm (0.75 mil) to about 254 µm (10 mil), most typically about 101.6 µm (4 mil).

The above description and examples illustrate certain embodiments of the present invention and are not to be interpreted as limiting. Selection of particular embodiments, combinations thereof, modifications, and adaptations of the various embodiments, conditions and parameters normally encountered in the art will be apparent to those skilled in the art and are deemed to be within the spirit and scope of the present invention.

What is claimed:

1. A peelable/resealable package comprising:
   a top end and a bottom end generally opposite the top end;
   a first side edge and a second side edge generally opposite the first side edge;
   a first wall panel having an interior surface and an exterior surface; a second wall panel having an interior surface and an exterior surface;
   a first side heat seal located adjacent to the first side edge which extends from the top end to the bottom end; a second side heat seal located adjacent to the second side edge which extends from the top end to the bottom end;
   a first peelable/resealable transverse heat seal located generally near the top end and extending between the first side edge and the second side edge, which joins the interior surface of the first wall panel to the interior surface of the second wall panel;
   an absorbent non-woven strip having a top end and a bottom end where the top end of the non-woven absorbent strip is located generally near the top end of the package, which is inserted between the first and second wall panels;
   an initial closed position; wherein the first peelable/resealable transverse heat seal is placed either superimposed over at least a portion of the non-woven absorbent strip that includes the bottom end of the non-woven absorbent strip that is towards the bottom end of the package or offset between the non-woven absorbent strip and the bottom end of the package; and
   an open position where the first wall panel and the second wall panel are separated at the first peelable/resealable transverse heat seal; wherein the open position comprises an exposed first section of the interior surface of the first wall panel comprising a pressure sensitive adhesive, an exposed second section of the interior surface of the first wall panel comprising a non-woven absorbent material, an exposed first section of the interior surface of the second wall panel comprising a pressure sensitive adhesive, and an exposed second section of the interior surface of the second wall panel comprising a non-woven absorbent material.

2. A package according to claim 1, wherein the first and second wall panels are each constructed from the same thermoplastic film.

3. A package according to claim 2, further comprising a pressure sensitive adhesive strip which is inserted between the first and second wall panels and heat sealed to at least one of the first wall panel or the second wall panel.

4. A package according to claim 1, wherein the first wall panel is formed from a non-thermoformed multilayer thermoplastic film and the second wall panel is formed from a thermoformed multilayer thermoplastic film.

5. A package according to claim 4, wherein the non-thermoformed multilayer thermoplastic film comprises a pressure sensitive adhesive layer.

6. A package according to claim 4, further comprising a pressure sensitive adhesive strip which is inserted between the first and second wall panels and heat sealed to at least one of the first wall panel or the second wall panel.

7. A package according to claim 4, wherein the thermoformed multilayer thermoplastic film comprises an ethylene vinyl alcohol copolymer layer.

8. A package according to claim 4, wherein the non-thermoformed multilayer thermoplastic film is a flexible film and the thermoformed multilayer thermoplastic film is a rigid or semi-rigid substrate.

9. A package according to claim 4, wherein the non-thermoformed multilayer thermoplastic film and the thermoformed multilayer thermoplastic film are each a flexible substrate.

10. A package according to claim 4, wherein the non-thermoformed multilayer thermoplastic film and the thermoformed multilayer thermoplastic film are each a rigid or semi-rigid substrate.

11. A package according to claim 1, wherein the first side seal, the second side seal and the first peelable/resealable transverse heat seal define a product cavity.

12. A package according to claim 1, wherein the non-woven absorbent strip comprises a first layer of heat sealable material in direct contact with a second layer of non-woven absorbent material.

13. A package according to claim 12, wherein the heat sealable material is selected from the group consisting of polyethylene, ethylene vinyl acetate copolymer, ionomer and blends thereof.

14. A package according to claim 1, wherein the non-woven absorbent strip comprises a first layer of heat sealable material in direct contact with a second layer of non-woven absorbent material in direct contact with a third layer of heat sealable material.

15. A package according to claim 14, wherein the heat sealable material is selected from the group consisting of polyethylene, ethylene vinyl acetate copolymer, ionomer and blends thereof.

16. A package according to claim 1, wherein the non-woven absorbent strip comprises a first layer of heat sealable material in direct contact with a second layer of non-woven material in direct contact with a third layer of an oriented thermoplastic layer in direct contact with a fourth layer of pressure sensitive adhesive.

17. A package according to claim 16, wherein the heat sealable material is selected from the group consisting of polyethylene, ethylene vinyl acetate copolymer, ionomer and blends thereof.

18. A package according to claim 16, wherein the oriented thermoplastic layer is selected form the group consisting of polyethylene terephthalate, polypropylene and polyamide.

19. A peelable/resealable package comprising:
a top end and a bottom end generally opposite the top end;
a first side edge and a second side edge generally opposite the first side edge;
a first wall panel having an interior surface and an exterior surface; a second wall panel having an interior surface and an exterior surface;
a first side heat seal located adjacent to the first side edge which extends from the top end to the bottom end; a second side heat seal located adjacent to the second side edge which extends from the top end to the bottom end;
a first peelable/resealable transverse heat seal located generally near the top end and extending between the first side edge and the second side edge, which joins the interior surface of the first wall panel to the interior surface of the second wall panel;
an absorbent non-woven strip having a top end and a bottom end where the top end of the non-woven absorbent strip is located generally near the top end of the package and is inserted between the first and second wall panels;
a second peelable/resealable transverse heat seal positioned laterally offset away from non-woven absorbent strip and the first peelable/resealable transverse heat seal towards the bottom of the package and extending between the first side edge and the second side edge, which joins the interior surface of the first wall panel to the interior surface of the second wall panel;
a product cavity defined by the first side seal, the second side seal and the second peelable/resealable transverse heat seal;
an initial closed position; wherein the first peelable/resealable transverse heat seal is placed either superimposed over at least a portion of the non-woven absorbent strip or offset between the non-woven absorbent strip and the top end of the package; and
an open position where the first wall panel and the second wall panel are separated at the first peelable/resealable transverse heat seal and at the second peelable/resealable transverse heat seal; wherein the open position comprises an exposed first section of the interior surface of the first wall panel comprising a pressure sensitive adhesive, an exposed second section of the interior surface of the first wall panel comprising a non-woven absorbent material, an exposed first section of the interior surface of the second wall panel comprising a pressure sensitive adhesive, and an exposed second section of the interior surface of the second wall panel comprising a non-woven absorbent material.

20. A package according to claim 19, wherein the first side seal, the second side seal and the second peelable/resealable transverse heat seal define a product cavity.

* * * * *

UNITED STATES PATENT AND TRADEMARK OFFICE
CERTIFICATE OF CORRECTION

| | |
|---|---|
| PATENT NO. | : 10,464,728 B2 |
| APPLICATION NO. | : 15/561619 |
| DATED | : November 5, 2019 |
| INVENTOR(S) | : Tara K. Cruz |

It is certified that error appears in the above-identified patent and that said Letters Patent is hereby corrected as shown below:

In the Specification

Column 1, Line 53, replace "failing" with -- falling --

Column 1, Line 54, replace "re tack adhesion at" with -- re-tack adhesion --

Column 5, Line 9, replace "invention," with -- invention. --

Column 5, Line 14, replace "cross-sectional" with -- a cross-sectional view --

Column 6, Line 13, replace "60" with -- 50 --

Column 9, Line 37, replace "(BON)" with -- (BON), --

In the Claims

Column 12, Line 2, replace "form" with -- from --

Signed and Sealed this
Third Day of May, 2022

Katherine Kelly Vidal
*Director of the United States Patent and Trademark Office*